United States Patent [19]

Kato

[11] Patent Number: 4,938,610

[45] Date of Patent: Jul. 3, 1990

[54] ROLLING CONTACT DEVICE

[75] Inventor: Heizaburo Kato, Shizuoka, Japan

[73] Assignee: Sankyo Manufacturing Company, Ltd., Tokyo, Japan

[21] Appl. No.: 331,129

[22] Filed: Mar. 31, 1989

[30] Foreign Application Priority Data

Mar. 31, 1988 [JP] Japan .............................. 63-43328[U]

[51] Int. Cl.$^5$ ........................ F16C 21/00; F16C 19/52
[52] U.S. Cl. ...................................... 384/126; 74/569; 384/58; 384/127; 384/587; 384/624
[58] Field of Search ...................... 384/50, 55, 58, 126, 384/127, 449, 515, 543, 546, 549, 564, 569, 586, 587, 624, 102; 74/569

[56] References Cited

U.S. PATENT DOCUMENTS

| 1,946,652 | 2/1934 | Wallgren | 384/127 |
|---|---|---|---|
| 2,352,911 | 7/1944 | Osplack . | |
| 2,643,162 | 6/1953 | Barr | 384/58 |
| 3,393,022 | 7/1968 | Alven et al. | 384/127 |
| 3,445,146 | 5/1969 | Alexander et al. . | |
| 3,596,533 | 8/1971 | Nightingale | 384/127 X |
| 4,106,826 | 8/1978 | Marola | 74/569 X |
| 4,113,327 | 9/1978 | Koch | 74/569 X |
| 4,623,269 | 11/1986 | Burg | 384/624 X |

FOREIGN PATENT DOCUMENTS

| 0304397 | 2/1989 | European Pat. Off. . | |
| 2707352 | 8/1978 | Fed. Rep. of Germany . | |
| 54-20534 | 7/1979 | Japan . | |
| 311338 | 1/1956 | Switzerland | 384/126 |
| 1189965 | 4/1970 | United Kingdom . | |

Primary Examiner—Thomas R. Hannon
Attorney, Agent, or Firm—Pollock, Vande Sande & Priddy

[57] ABSTRACT

A rolling contact device having a shaft adapted to be secured to an element of an apparatus, an outer ring adapted to be in rolling contact with another element of the apparatus, and rolling elements disposed between the shaft and the outer ring, includes an abutting portion provided on each shaft and the outer ring, the abutting portions on the shaft and the outer ring being opposed to each other with a small gap defined therebetween. These abutting portions are arranged such that, when an excessive radial load is applied to the outer ring, the abutting portions are brought into contact with each other to prevent permanent deformation of rolling contact portions of the device.

3 Claims, 3 Drawing Sheets

ROLLING CONTACT DEVICE

BACKGROUND OF THE INVENTION

1. Field of the Invention

The present invention relates to a rolling contact device such as a cam follower, used in the technical field of machine tool or the like, and more particularly to a rolling contact device which comprises a shaft having an outer track surface, an outer ring surrounding the shaft and having an inner track surfaces, and rolling elements disposed between the shaft and the outer ring in a relationship spaced apart from each other circumferentially of the shaft.

2. Description of the Prior Arts

Heretofore, there is known a rolling contact device of the above mentioned type, in which one end of the shaft is adapted to be secured to an element of a machine and the peripheral surface of the outer ring is made in rolling contact with a cam surface of a cam serving as a cam follower. Such a cam follower is disclosed, for example, in Japanese Patent Publication No. 54-20534. The rolling contact device of this type is also used for moving a machine element together with the rolling contact device along a guiding rail with one end of the shaft secured to the machine element and with the peripheral surface of the outer ring in rolling contact with the rail.

The above-mentioned rolling contact device of the prior art suffers from a problem that when a radial load exceeding a certain value, such as an impact load, is applied to the outer ring, permanent deformations or press traces occur on the contact portions of the track surface of the shaft, the rolling elements and the track surface of the outer ring, thereby deteriorating the precision of the device.

SUMMARY OF THE INVENTION

It is an object of the present invention to provide a rolling contact device which may solve the abovedescribed problem of the prior art.

According to the present invention, a rolling contact device comprises: a shaft having an outer track surface; an outer ring surrounding the shaft and having an inner track surface; rolling elements disposed between the shaft and the outer ring in a relationship spaced apart from each other circumferentially of the shaft, the outer peripheral surface of the outer ring being adapted to be in rolling contact with a track surface of an element of an apparatus; and an at least one abutting portion provided on each of the shaft and the outer ring; the abutting portions on the shaft and the outer ring being radially opposed to each other with a small gap defined therebetween, such that, when a radial load exceeding a predetermined value acts on the outer ring, the abutting portions may abut against each other, thereby reducing radial load acting on contact portions of the track surface of the outer ring, the rolling elements and the track surface of the shaft.

The above and other objects, features and advantages of the invention will become more apparent from the following description with reference to the accompanying drawings.

DETAILED DESCRIPTION OF THE PREFERRED EMBODIMENTS

Figure 1:
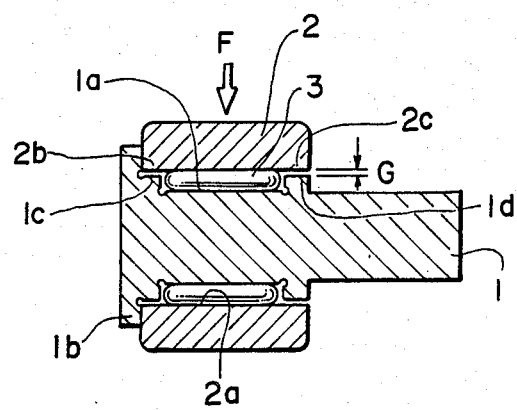
FIG. 1 is a cross-sectional view of a rolling contact device according to a first embodiment of the present invention.

FIGS. 1 shows a rolling contact device according to the first embodiment of the present invention.

The rolling contact device comprises a shaft 1 having an outer track surface 1a, an outer ring 2 surrounding the shaft 1 and having an inner track surface 2a, and rolling elements 3 arranged between the shaft 1 and the outer ring 2 in rolling contact with the track surface 1a of the shaft 1 and the track surface 2a of the outer ring 2. The rolling elements are composed of needle rollers arranged in a relationship spaced apart from each other circumferentially of the shaft 1. The shaft 1 is integrally formed with a flange 1b at its left end for preventing outer ring 2 from moving to the left and slipping out from the shaft 1.

The shaft 1 is formed with abutting portions 1c, 1d adjacent to the both ends of the track surface on each other, thereby relieving or reducing the load 1a, and the outer ring 2 includes abutting portions 1c, on each other, thereby relieving or reducing the load 1d located opposite to the abutting portions 1c, 1d, respectively. The abutting portions 1c, 1d and the abutting portions 2b, 2c are opposite to each other with a gap G of a predetermined size or depth formed therebetween. When a radial load F, greater than a predetermined value, acts on the outer ring 2 and the outer ring deforms radially over a predetermined amount, the abutting portions abut on each other, thereby relieving or reducing the load acting on the contact portions of the track surface 2a of the outer ring 2, the rolling elements 3 and the track surface 2a of the shaft 1. In the first embodiment, the abutting portions 1c, 1d are constituted by annular projections located along the periphery of the shaft 1 adjacent to both axial ends of the track surface 1a. The outer ring 2 has an inner cylindrical surface of a constant diameter, and the ring portions 2b, 2c adjacent to the track surface 2a serve as the abutting portions.

The rolling contact device shown in FIG. 1 is used in such a manner that the shaft 1 is secured to a machine element (not shown) at the of the shaft, while the outer ring 2 is placed in contact with a cam, rail or the like. When a radial load F greater than a predetermined value is applied to the outer ring 2 while the ring 2 is in a rotating or not-rotating state, the radial deformation of the outer ring 2 towards the shaft 1 becomes equal to the gap G, and the abutting portions 2b, 2c abut on the abutting portions 1c, 1d. In this state, a part of the radial load is directly transferred to the shaft 1 through these abutting portions, thereby relieving or reducing load acting on the rolling contact portions of the device.

If a rolling contact device does not have the abutting portions 1c, 1d, 2b, 2c, the relation between a radial elastic deformation δ(mm) of the outer ring 2, maximum load Qm (kgf) acting on the rolling element, and an effective length La (mm) of each rolling element, is expressed, similarly to the case of a roller bearing, by the following equation:

$$\delta = 0.0006 \frac{Qm^{0.9}}{La^{0.8}} \quad (1)$$

Assuming that a radial load corresponding to the basic static nominal load Co (kgf) of the device acts on the outer ring 2, the maximum load Qm on each rolling element can be calculated by the following equation (2), which Z designates the number of the rolling element 3. In such a rolling contact device of bearing under an usual operation, it is experimentally recognized that a deformation of a rolling element or a roller smaller than 1/10000 of the rolling element diameter is permitted without causing any operational trouble. Accordingly, a static load causing such permanent deformation is referred to as a basic static nominal load.

$$Qm = \frac{4.08}{Z} Co \quad (2)$$

The elastic deformation $\delta$ of the outer ring 2 deduced from equations (1) and (2) is based on the assumption that no abutting portions $1c$, $1d$, $2b$, $2c$ are provided and a basic static nominal load is applied. By arranging the abutting portions $1c$, $1d$, $2b$, $2c$ so as to make the gap G smaller than this elastic deformation $\delta$, when a basic static nominal load is applied, the abutting portions $2b$, $2c$ always abut on abutting portions $1c$, $1d$, thereby relieving the load acting on the rolling contact portions. In consequence, the above-mentioned gap G is preferred to be below the elastic deformation. In actual operation of the device, it is desired for the abutting portions $2b$, $2c$ to slide along the abutting portions $1c$, $1d$ with a lubricant oil present in the gap G, similar to the case of a plane bearing. In such a case, the amount or size of the gap G is preferred to be a little greater than the sum of the elastic deformation of the outer ring caused when a maximum radial load (design load) is applied thereto in an usual operation of the device, and the allowable minimum thickness of a lubricant oil film for effecting a fluid lubrication.

Figure 2:
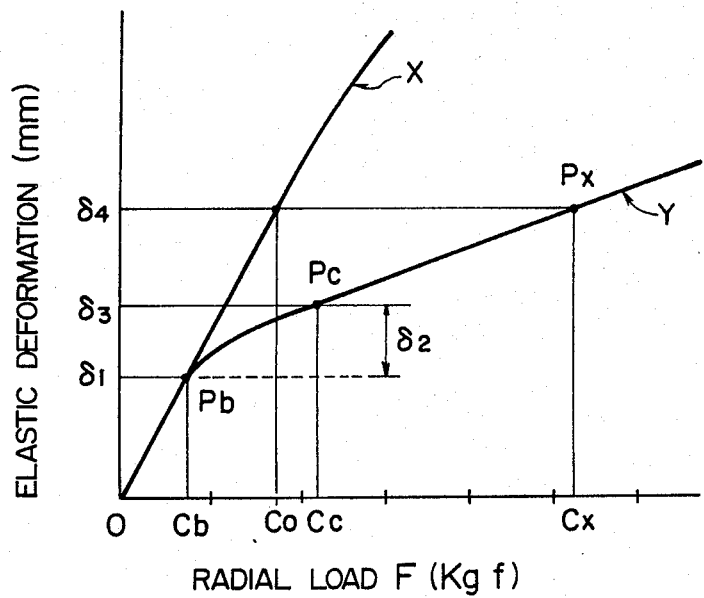
FIG. 2 shows the function and the advantage of a rolling contact device of the present invention.

FIG. 2 shows a relation between a radial load F (kgf) acting on the rolling elements and an outer ring deformation $\delta$(mm). In the FIG., line X shows a theoretical characteristic of a device of a prior art which has no abutting portions such as $1c$, $1d$, $2b$, $2c$. Line Y shows an example of a characteristic of the illustrated embodiment having the abutting portions $1c$, $1d$, $2b$, $2c$. Line Y shows a characteristic of the rolling contact device according to the illustrated embodiment of the present invention, where the size or depth of the gap G is made equal to the sum $\delta_3$ of the outer ring maximum deformation $\delta$, resulted from maximum radial load applied to the outer ring during usual operation and minimum allowable thickness $\delta_2$ of the lubricant oil. As obvious from line X in FIG. 2, in the prior art, the deformation of the outer ring linearly increases substantially in proportion to the increase of the radial load, and reaches $\delta_4$ when a radial load corresponding to the basic static nominal load Co acts on the outer ring. In an usual operation, that is in a radial load range below point Cb which corresponds to the outer ring displacement $\delta_1$, line X coincides with line Y, in other words, the function of the device of the present invention is identical to that of the device of the prior art. In the range between point Pb and point Pc at which the radial load is Cc and the deformation of the outer ring reaches the value $\delta_3$, the gap G gradually decreases from the allowable minimum thickness of the lubricant oil film. In this range, since the abutting portions $2b$, $2c$ abut on the abutting portions $1c$, $1d$ with an oil film interposed therebetween the deformation of the outer ring increases along a gentle slope as the load increases. When the radial load reaches Cc corresponding to point Pc, the abutting portions $2b$, $2c$ directly contact with the abutting portions $1c$, $1d$ with no oil film therebetween. When the radial load further increases beyond point Cc, the deformation of the outer ring linearly increases along a slope gentler than the above-mentioned slope between point 0 and point Pb due to the greater stiffness of the rolling contact device. In consequence, the basic static nominal load corresponding to the outer ring displacement $\delta_4$ is Co in the prior art, while in the illustrated embodiment as indicated by line Y, it is Cx which is considerably greater than Co.

As mentioned above by referring to FIG. 2, since the outer ring deformation reaches $\delta_4$ only when a greater load Cx is applied on the ring, permanent deformations of the rolling contact portions assumed to be caused by an impact load applied on the outer ring can be effectively prevented. Referring to line Y, in the range from Pb to Pc, the oil film gradually becomes thinner with an increasing frictional force accompanied, while in the range from Pc to Px, the abutting portions $2b$, $2c$ directly abut on the abutting portions $1c$, $1d$ with no oil film therebetween, making it difficult for the outer ring to rotate. Therefore, when a radial load greater than Cb, particularly the load greater than Cc, is applied on the outer ring which is in a rotating state, the rotation of the ring may be abruptly stopped in an inconvenient manner. Consequently, it may be said that the rolling contact device of the present invention is most suitable to be used for a device suffering an impact load which may be applied in a stationary state of the device. For example, the rolling contact device of the present invention may be used in an intermittent index device which transforms a continuous rotary motion of an input shaft to an intermittent rotary motion of an output shaft through a cam and rolling contact devices. In this case, there is the possibility that a large radial impact load may be applied to the outer rings of the rolling contact devices during the intermittent period for which the output shaft and hence the outer rings are in a stationary state, but no permanent deformation of the rolling contact portions may be caused by the impact load.

Line Y in FIG. 2 corresponds to a case where the gap G is made equal to the outer ring deformation $\delta_3$. However, the gap G may also be selected to be greater than the elastic deformation $\delta_3$, as mentioned before.

Figure 3:
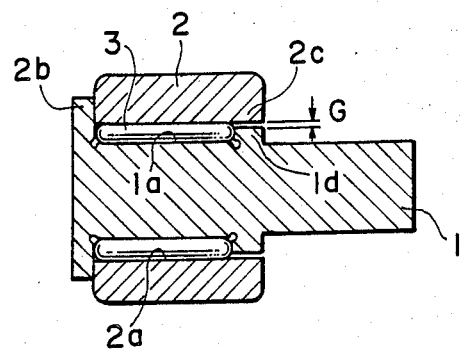
FIGS. 3, 4, 5, 6 and 7 show second, third, fourth, fifth and sixth embodiments of the present invention, respectively.
Figure 4:
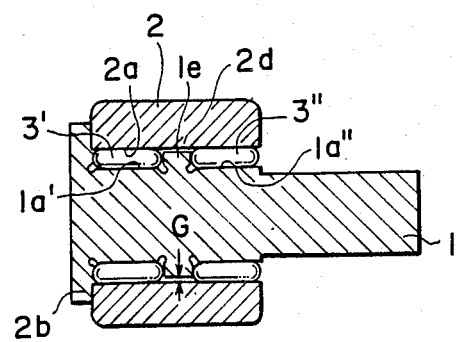
Figure 5:
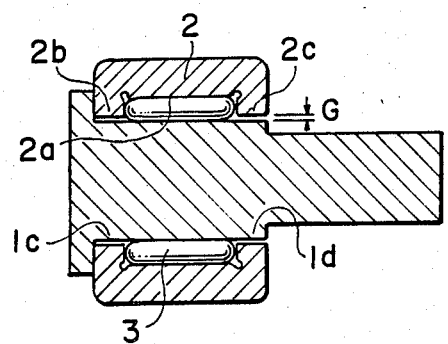

FIG. 3, FIG. 4 and FIG. 5 show second, third and fourth embodiments of the present invention, respectively. In the second embodiment shown in FIG. 3, annular abutting portion $1c$ and the opposite abutting portion $2b$ provided in the first embodiment shown in FIG. 1 are omitted, and a flange portion $2b$ is provided on the shaft 1 for abutting on the left end of the rolling elements 3. On the other hand, similarly to the first embodiment, shaft 1 is formed with an annular projection or abutting portion $1d$ adjacent to the right end of the rolling elements 3, which is opposite to abutting portion $2c$ of the outer ring 2. In the third embodiment shown in FIG. 4, the shaft 1 track surfaces $1a$ and $1a$ axially separated from each other. A plurality of rolling elements 3' are arranged around the track surface $1a'$, while a plurality of rolling elements 3"are arranged around the track surface 1a". The outer ring 2 having the track surface 2ais arranged around these rolling elements 3' and 3". The shaft 1 is formed with an annular projection 1edisposed between the track surface 1a'and the track surface 1a", which constitutes an abutting portion of the shaft 1. The outer ring portion opposite to the projection 1ewith a small gap G constitutes an abutting portion 2dof the outer ring 2. In the fourth embodiment shown in FIG. 5, the shaft 1 has a left end portion which has a substantially constant outside diameter greater than that of the right side portion of the shaft, and rolling elements 3 and outer ring 2 are mounted on this left end portion. In this fourth embodiment, the bottom surface of an annular groove formed in the inner surfaces of the outer ring 2 constitutes a track surface 2aof the outer ring 2, the outer ring portions adjacent to the ends of the track surface 2aconstitute abutting portions 2b, 2cof the outer ring 2, and the shaft portions opposite to the abutting portions 2b, 2cconstitute abutting portions 1c, 1dof the shaft 1.

Since in the second, third and fourth embodiments, the features other than those described above are similar to those of the first embodiment, such similar features are indicated by the same reference numbers or marks, and detailed descriptions thereof are omitted. The gap G is determined in the second, third, or fourth embodiment similarly to the first embodiment.

Figure 6:
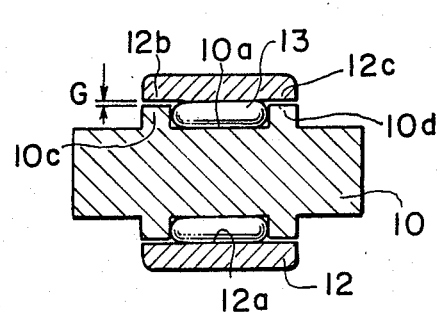

FIG. 6 shows a fifth embodiment of the present invention. The rolling contact device of this embodiment is of a so-called roller follower type, and comprises a shaft 10 having a constant diameter and a track surface 10aat its periphery, an outer ring 12 having a constant inside diameter and a track surface 12a, and a plurality of rolling elements 13 disposed 5 between the shaft and the outer ring at circumferential intervals and in rolling contact with the track surfaces 10aand 12a. The shaft 10 is formed with annular projections adjacent to the both ends of the track surface 10a, which constitute abutting portions 10c, 10dof the shaft 10. Outer ring portions opposite to the abutting portions 10c, 10d constitute abutting portions 12b, 12cof the outer ring 12 with a small gap G formed therebetween.

Figure 7:
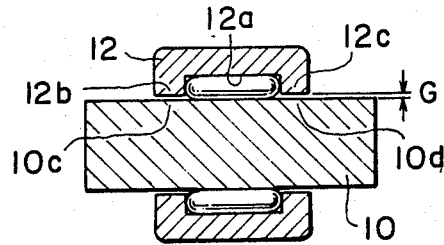

FIG. 7 shows a sixth embodiment of the present invention. In this embodiment, the shaft 10 is not formed with any annular projections such as the abutting portions 10c, 10dseen in the fifth embodiment. Instead, an outer ring 12 is formed with an annular inner groove, the bottom of which constitutes a track surface 12a, and outer ring portions adjacent to the both ends of the track surface 12aconstitute abutting portions 12b, 12c. Portions of shaft 10 opposite to the abutting portions 12b, 12cconstitute abutting portions 10c, 10 dof the shaft 10 with a small gap G formed therebetween. Other features of the sixth embodiment are similar to those of the fifth embodiment.

The size of the gap G in the fifth and sixth embodiments is determined in the same manner as in the first embodiment.

As mentioned above, the rolling contact device of the present invention brings about such advantages as to a decrease of the probability of permanent deformations of the device at its rolling contact portions, when an impact load of the like acts on the outer ring of the device.

What is claimed is:
1. A rolling contact device comprising:
a shaft having an outer track surface;
an outer ring surrounding said shaft and having an inner track surface;
rolling elements disposed between said shaft and said outer ring in a relationship spaced apart from each other circumferentially of said shaft, the outer peripheral surface of said outer ring being adapted to be in rolling contact with a track surface of an element of an apparatus;
an at least one abutting portion provided on each of said shaft and said outer ring;
the abutting portions on said shaft and said outer ring being radially opposed to each other with a small gap defined therebetween, and being arranged such that, when a radial load greater than a predetermined value acts on said outer ring, the abutting portions may abut against each other, thereby reducing radial load acting on contact portions among said track surface of said outer ring, said rolling elements and said track surface of said shaft;
wherein said gap is greater than the sum of a radial elastic deformation of said outer ring caused by a maximum radial load applied to the outer ring during an usual operation of the device and an allowable minimum thickness of a lubricant oil film existing between the abutting portion of said shaft and the abutting portion of said outer ring, and wherein said gap is smaller than an amount of radial elastic deformation of said outer ring, the amount of the latter radial elastic deformation corresponding to that attainable under the assumption that said abutting portions are not provided and a basic static nominal load is applied to said outer ring.

2. A rolling contact device as claimed in claim 1, wherein said abutting portion of said shaft includes a projection provided on said shaft.

3. A rolling contact device as claimed in claim 1, wherein said outer ring is formed with an annular inner groove having a bottom surface, said bottom surface constituting said track surface of said outer ring, and said abutting portion of said outer ring is located adjacent to said track surface of said outer ring.

* * * * *